Nov. 25, 1930.  P. G. MIDGETT  1,782,661
ANIMAL TRAP
Filed Aug. 17, 1928  3 Sheets-Sheet 2
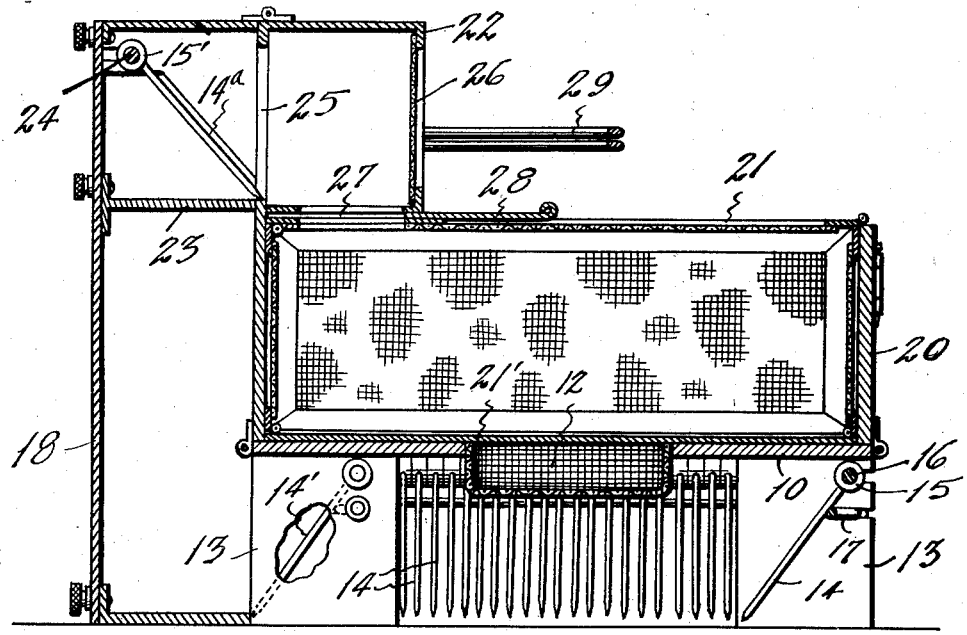
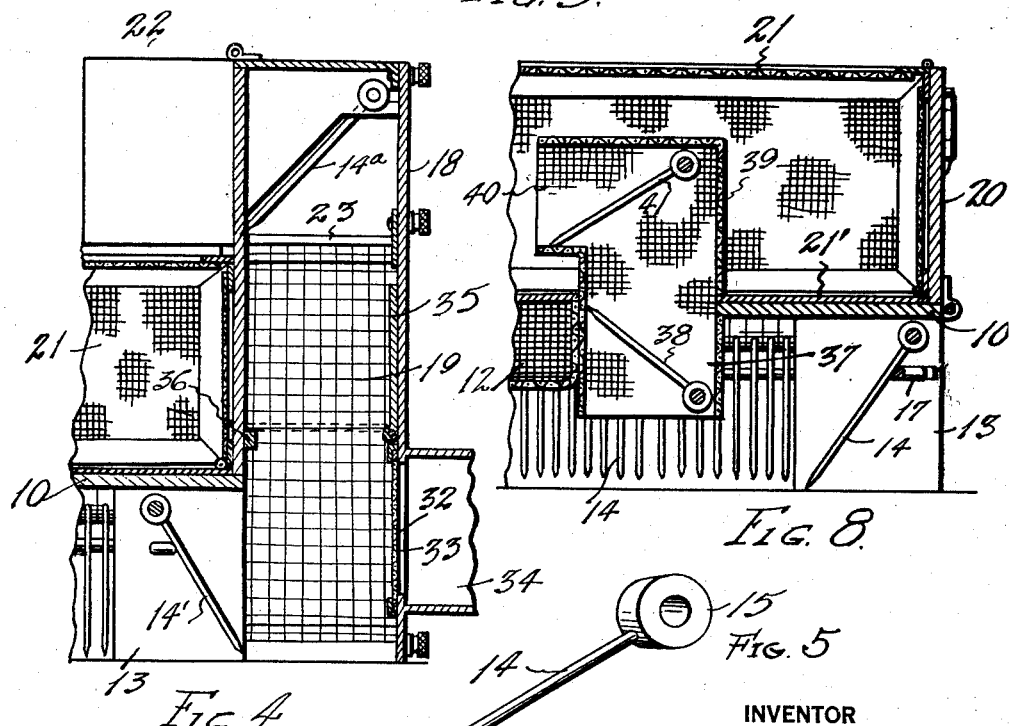
INVENTOR
P. G. MIDGETT
BY
ATTORNEY Nov. 25, 1930.  P. G. MIDGETT  1,782,661
ANIMAL TRAP
Filed Aug. 17, 1928  3 Sheets-Sheet 3

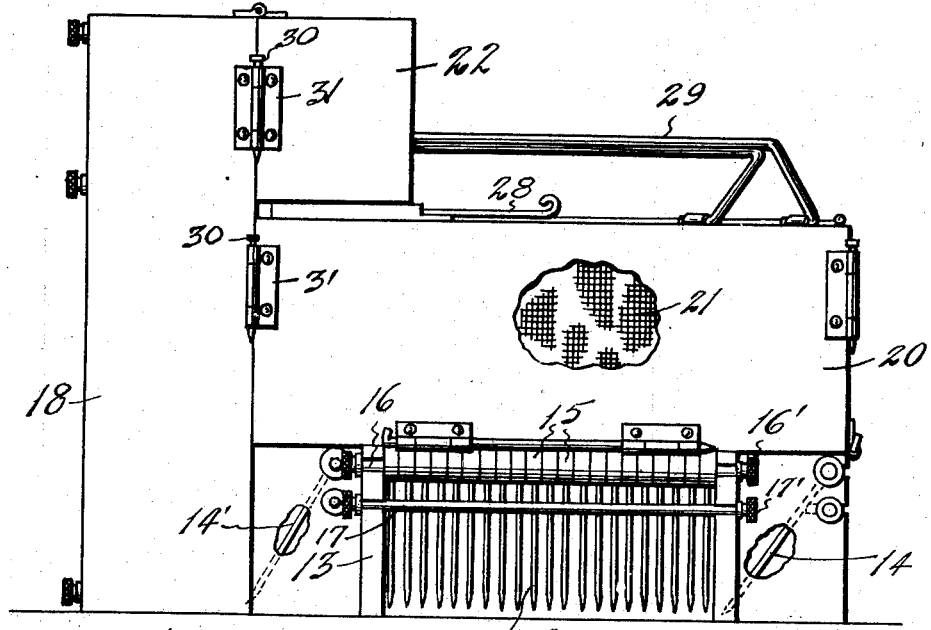
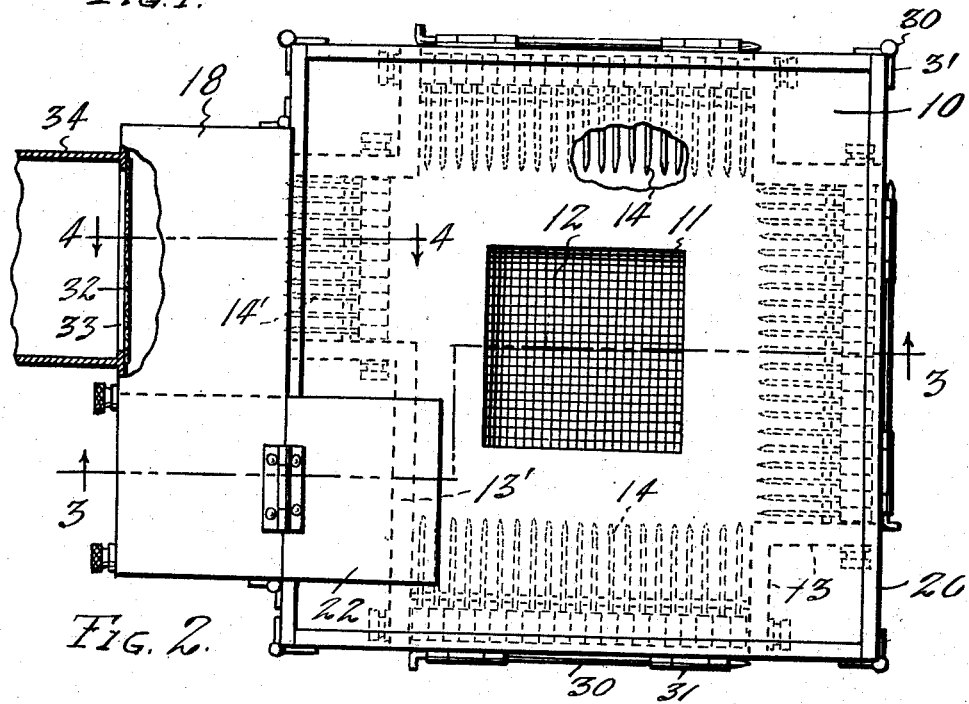

INVENTOR
P. G. MIDGETT
BY
ATTORNEY

Patented Nov. 25, 1930

1,782,661

UNITED STATES PATENT OFFICE

PENELTON G. MIDGETT, OF DALLAS, TEXAS

ANIMAL TRAP

Application filed August 17, 1928. Serial No. 300,233.

This invention relates to new and useful improvements in animal traps.

One object of the invention is to provide a trap which will be highly efficient in the catching of rats, mice or other small animals, as well as larger animals if desired.

Another object of the invention is to provide a trap into which the animal will readily enter and from which he cannot escape after once entering.

Various novel features and important improvements making for simplicity, convenience and efficiency will be hereinafter more particularly pointed out.

Figure 6:
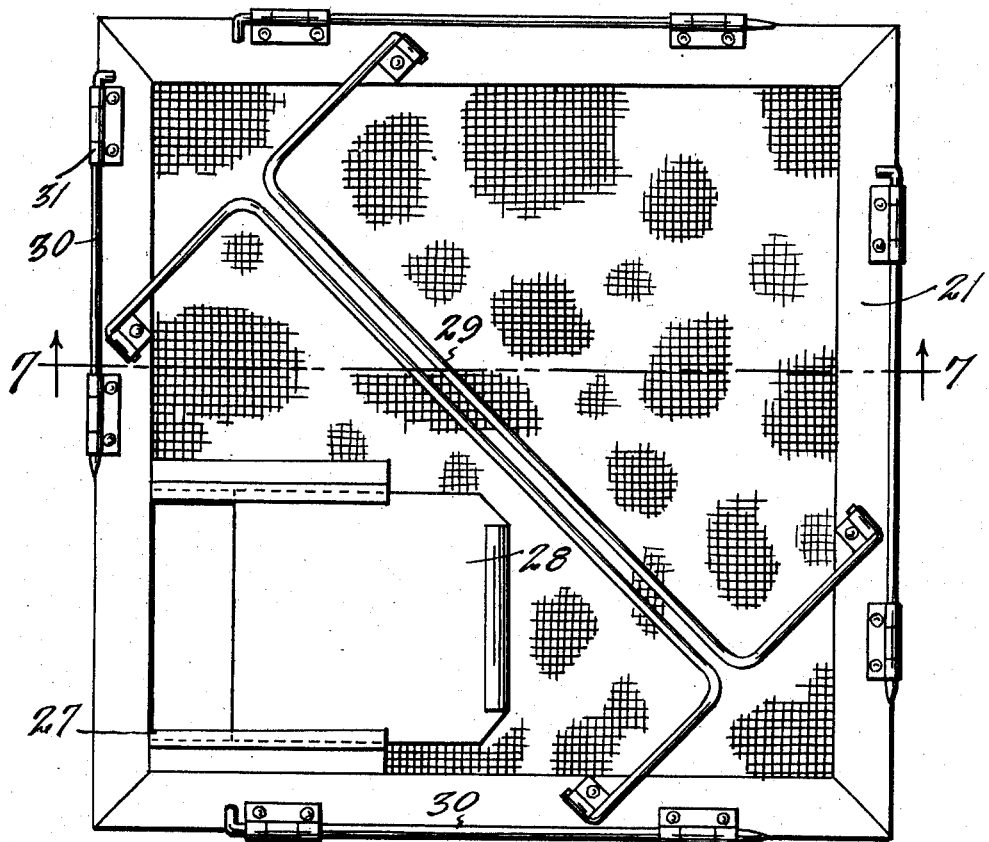
Figure 7:
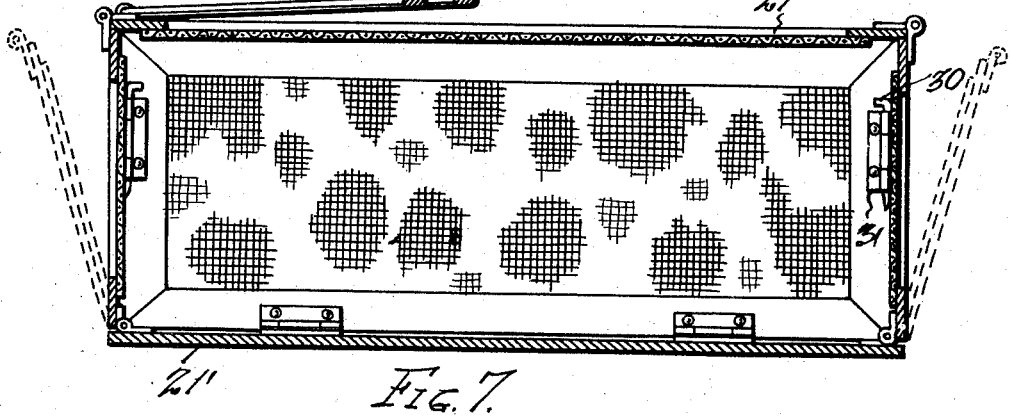

The invention will be more readily understood from a reading of the following specification and by reference to the accompanying drawings, in which an example of the invention is shown, and wherein:

Fig. 1 is an elevation of a trap constructed in accordance with the invention,

Fig. 2 is a plan view of the same, portions being shown in section and the cage being omitted, Fig. 3 is a transverse vertical sectional view taken on the line 3—3 of Fig. 2, Fig. 4 is a transverse vertical sectional view taken on the line 4—4 of Fig. 2, Fig. 5 is a detail of one of the gate fingers, Fig. 6 is a plan view of the cage, Fig. 7 is a transverse vertical sectional view taken on the line 7—7 of Fig. 6, and Fig. 8 is a transverse vertical sectional view showing a modified form of the invention.

In the drawings the numeral 10 designates a rectangular platform in the center of which is provided an opening 11 through which bait may be introduced into a basket 12 (Figs. 2 and 3) depending from the platform. The platform is supported at each corner upon flanged legs 13, each leg comprising a pair of vertical flanges directed outwardly at right-angles to each other and having their outer edges substantially flush with the overhanging edge of the platform. One of the legs, as is indicated in dotted lines in Fig. 2, has one of its flanges 13' elongated, whereby its shorter flange is disposed nearer the adjacent leg than in other instances.

Between the legs gateways are provided through which the animal may enter. In each gateway I provide a gate or barrier composed of individual pivoted fingers 14 each having a pointed end and extending from a cylindrical head 15, as is shown in detail in Fig. 5. The heads are assembled on shafts 16 fastened in the legs 13 and 13' by nuts 16'. The heads 15 act to space the fingers apart and provide free pivotal mountings for the fingers, which latter are long enough to incline inwardly when resting on the support with which the trap is provided.

In order to support the points of the fingers above the floor of the trap or support on which it rests or to vary the adjustment of the fingers, a crankshaft 17 is provided at each gateway. The crankshaft is mounted in the legs 13 and 13' and is equipped with nuts 17', which when tightened will hold the crankshaft in position. By adjusting this crankshaft, the fingers which rest thereon are supported in the desired position. For trapping some kinds of animals it is desirable to have a floor in the trap, but for other animals it is best not to have such a floor. It will be seen that once the animal passes between the legs and the fingers fall behind it, said animal cannot escape. By providing the open gateways on the four sides of the trap the animal can see through the same from opposite sides and is thus induced to enter.

The bait basket 12 hanging relatively within the gates and being visible there-through attracts the animal which enters by swinging the fingers 14 upward. The animal thus caught in the lower chamber of the trap seeks to escape. The fingers in the gateway between the leg having the flange 13' and the corresponding leg, which are designated by the numeral 14', are inclined outwardly instead of inwardly and the animal may thus escape by passing under these fingers into a vertical box 18 secured to one side of the trap. This box extends above the platform 10 and has an inclined ladder 19 therein.

To the four sides of the platform I hinge sideboards 20, these sideboards constituting an upper chamber and in this upper chamber a cage 21 is removably mounted. The box 18 extends above the cage and has a hood 22 hinged thereto so as to overhang the cage. As is shown in Figs. 3 and 4, a landing 23 is arranged at the top of the ladder and fingers 14ª having heads 15′ are mounted on a shaft 24 and inclined to an opening 25 leading into the hood 22. The hood 22 has a screened window 26 opposite the opening.

The animal, upon escaping into the box 18, is induced to climb the ladder 19 because of the light entering the window 26. Upon reaching the landing 23 and still seeking light, the animal will push up the fingers 14ª and enter the hood 22. The bottom of the hood is opened and the animal will fall through a framed opening 27 in the top of the cage 21. A slide 28 is arranged in the frame of the opening 27 and may be closed to retain the trapped animals when the cage is removed.

The cage is made of wire mesh or other suitable panels except its bottom 21′ which is preferably of sheet metal. A pair of handle bails 29 are hinged to the top of the cage. The sideboards 20 conceal the sides of the cage so that the animals trapped therein can not be seen by the animals approaching the trap.

For convenience it is desirable to hinge the various parts and to provide the hinges with removable pintles 30, which connect the leaves 31 of the hinges. The box 18 is secured to the sideboards by these hinges and the sideboards are likewise secured together. The hood 22 is fastened against the box and over the cage by these hinges. When it is desired to remove the cage, the pintles 30 on each side of the hood are removed and the hood is swung upward, which permits the cage to be lifted from the upper chamber. The sides of the cage are provided with said hinge leaves 31 and pintles 30 so that the cage may be opened to remove the animals. The entire cage is metal and the parts of the trap may be made of wood, metal or any other suitable material.

A trap of this nature permits of considerable variation. In Figs. 2 and 4 I have shown the box 18 provided with a sliding gate 32 formed of wire mesh and covering an opening 33 from which a chute 34 extends. A trap door 35 is hinged above the slide and may be swung down onto a stop 36 to close the upper portion of the box and prevent the animal climbing the ladder 19. By this arrangement the trapped animals may be led through the chute 34 to any suitable trapping enclosure and the cage and upper portion of the trap not used. It is to be understood that the trap may be constructed without the elements 32 to 36 inclusive.

In Fig. 8 I have shown another form in which the box 18 and the hood 22 are omitted and also in which the gateways will be the same on all four sides. In this form a collar 37 depends from the platform 10 at one side of the bait basket 12 and is provided with pivoted fingers 38 like the fingers 14, but inclined upwardly. The animal, seeking escape, will climb upwardly past these fingers into a foraminous hood 39 in the cage 21. The hood has an outlet collar 40 at one side and is provided with fingers 41 resting in this collar so as to prevent the animal getting back into the hood once he has passed under said fingers. In each instance the points of the fingers may be made quite sharp and the animals will thus be induced to move quickly under the same and not to attempt more than one backward movement.

Various changes in the size and shape of the different parts, as well as modifications and alterations, may be made within the scope of the appended claims.

What I claim is:

1. In an animal trap, an elevated platform, a bait basket depending from the platform, gates having points at their lower ends hinged under the platform, an outlet from under the platform, a gate closing said outlet, and a trap cage removably supported upon the top of the platform and having an opening and closure connected with the outlet.

2. In an animal trap, an elevated platform, a bait basket depending from the platform, gates having points at their lower ends hinged under the platform, an outlet from under the platform, a gate closing said outlet, a trap cage removably mounted on top of the platform and connected with the outlet, and side boards mounted upon the platform to surround and conceal the cage from the approaching animal.

3. In an animal trap, an elevated platform, entrance gates under the platform, a box contiguous to one side of the platform and having an entrance from under the platform, a closure for said box entrance, a ladder in the box, a cage removably supported on top of the platform, and a passage from the ladder to the cage.

4. In an animal trap, an elevated platform, entrance gates under the platform, a box contiguous to the platform and having an entrance from under the platform, a closure for said box entrance, a ladder in the box, a landing in the box at the top of the ladder, a cage removably mounted on the platform, a hood connected with the landing and overhanging the cage, and a gate between the hood and the landing.

5. In an animal trap, an elevated platform, entrance gates under the platform, a box contiguous to the platform, and having an entrance from under the platform, a closure for said box entrance, a ladder in the box, a landing in the box at the top of the ladder, a cage removably mounted on the platform, a hood connected with the landing and overhanging the cage, a gate between the hood and the landing, and sideboards mounted on the platform and concealing the sides of the cage.

6. In an animal trap, an elevated platform, an inwardly swinging gate hinged beneath the platform, an outlet from under the platform, an outwardly swinging gate closing said outlet, a removable cage having a closure and supported upon the platform, and a passageway connecting said outlet with an opening into said cage at the closure.

7. In an animal trap, an elevated platform, supporting walls therefor, a gate including a shaft mounted in said walls and a plurality of fingers having cylindrical heads hinged on said shaft, and an adjustable crank shaft in supporting contact with all the fingers and adapted to vary the inclined position thereof.

In testimony whereof I affix my signature.

PENELTON G. MIDGETT.